United States
Janssen

[15] 3,660,755
[45] May 2, 1972

[54] DUAL FOCUSED LOG HAVING ALTERNATELY ENERGIZED FOCUSING APPARATUS THEREIN

[72] Inventor: Herman W. Janssen, Kiel, Germany
[73] Assignee: Dresser Industries, Inc., Dallas, Tex.
[22] Filed: Nov. 7, 1969
[21] Appl. No.: 874,748

[52] U.S. Cl. ............................................................ 324/10
[51] Int. Cl. ......................................................... G01v 3/18
[58] Field of Search ............................................. 324/1, 10

[56] References Cited

UNITED STATES PATENTS

| | | | |
|---|---|---|---|
| 2,712,630 | 7/1955 | Doll | 324/1 |
| 2,779,912 | 1/1957 | Waters | 324/10 X |
| 2,880,389 | 3/1959 | Ferre et al. | 324/1 |
| 2,972,101 | 2/1961 | Witte | 324/10 X |
| 3,075,142 | 1/1963 | Albright et al. | 324/1 |
| 3,262,050 | 7/1966 | Threadgold et al. | 324/10 |
| 3,373,349 | 3/1968 | Tanguy | 324/10 |

*Primary Examiner*—Gerard R. Strecker
*Attorney*—Robert W. Mayer, Thomas P. Hubbard, Jr., Daniel Rubin, Raymond T. Majesko, Roy L. Van Winkle, William E. Johnson, Jr. and Eddie E. Scott

[57] ABSTRACT

Methods and apparatus for simultaneously obtaining two focused logs of formation resistivity with different depths of investigation. A pair of nearby focusing current return electrodes is added to the subsurface apparatus of a conventional focused logging system and a second focusing current supply is added to the surface instrumentation. The preferred embodiment uses commutator devices to effect, alternately and repetitively, two different interconnections of the subsurface electrodes with the surface equipment whereby two logs are recorded on a single traverse of the borehole by the subsurface instrument. The two logs are combined to obtain a compensated focused current log representing improved measurements of the true resistivities of the formations. All subsurface elements of one focused logging system, except its focusing current return electrode, are time-shared with the other focused logging system.

6 Claims, 7 Drawing Figures

INVENTOR
HERMAN W. JANSSEN

AGENT

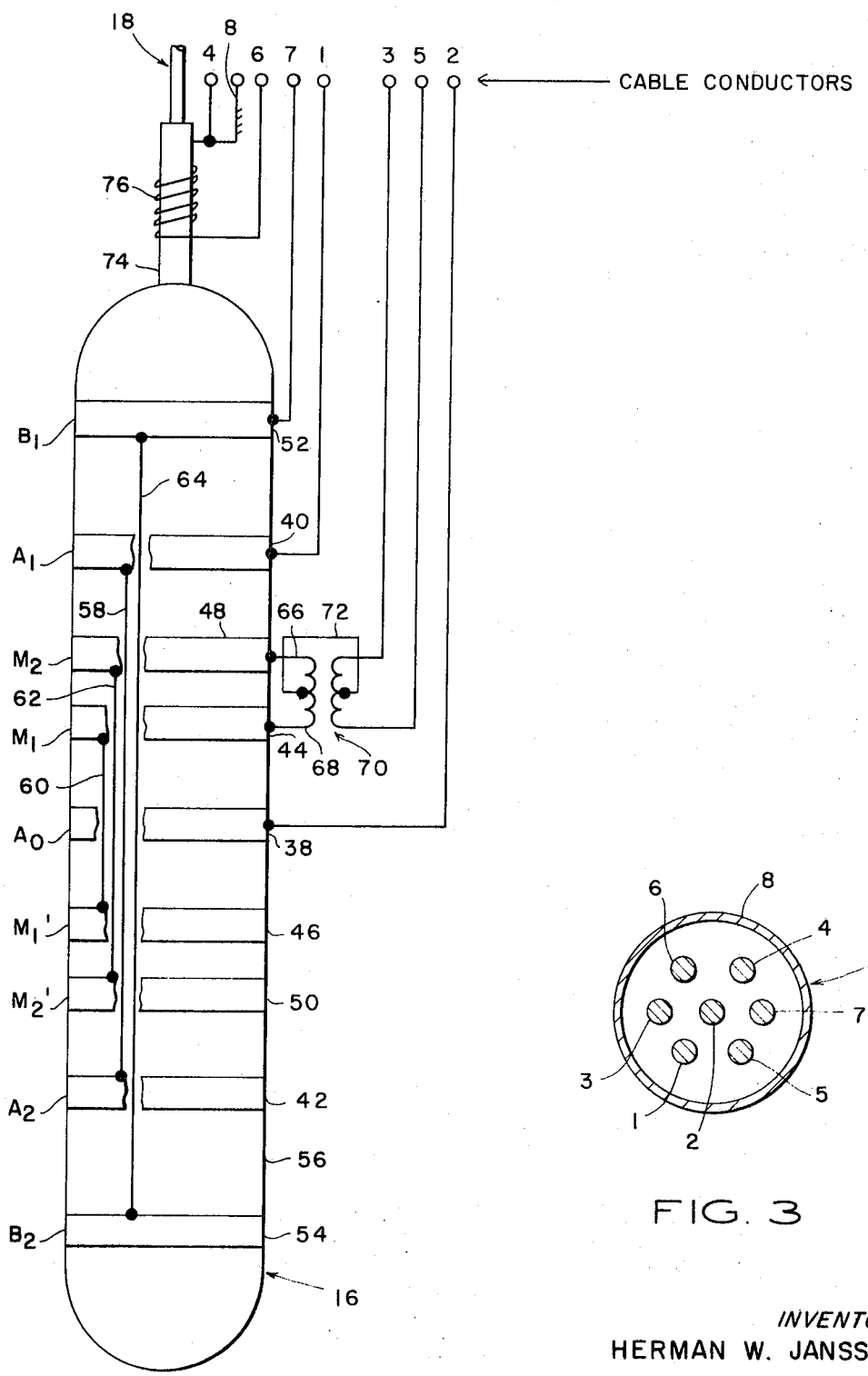

INVENTOR

HERMAN W. JANSSEN

Thomas P. Hubbard, Jr.

AGENT

DUAL FOCUSED LOG HAVING ALTERNATELY ENERGIZED FOCUSING APPARATUS THEREIN

BACKGROUND OF THE INVENTION

This invention relates generally to methods and apparatus for investigating the characteristics of formations surrounding a borehole penetrating earth formations and, in particular, for simultaneously investigating formation resistivities at different distances from the borehole using focused current systems. This invention is an improvement of my prior inventions in this field (see U.S. Pat. Nos. 2,967,272; 3,068,401; and 3,337,794) and of the Doll inventions disclosed in U.S. Pat. Nos. 2,712,627; 2,712,628; and 2,712,630. Perhaps the most pertinent prior art is the article "Suggested Modifications to the Grand Slam Suite" by H. B. Evans published on pages 99 – 102 of World Oil for Sept. 1966. Evans proposed the use of a dual focused resistivity device, but he stated that development of new tools to achieve the objectives he described "are expected to prove challenging to makers of such instruments" and further that "these proposed modifications remain both tentative and speculative." To my knowledge, my invention is the first simultaneous, dual depth of investigation focused current resistivity logging apparatus and method.

More specifically, this invention relates to methods and apparatus for simultaneously obtaining apparent resistivity values from different investigation depths into the formations as they are traversed by a subsurface instrument and recording simultaneously these values in correlation with the depth at which the values were obtained. This invention also encompasses conversion of the simultaneously obtained resistivities into a compensated apparent resistivity which is much closer to the true resistivity of the formation prior to the contamination resulting from drilling the borehole into the formation and the treatments, if any, of the formation thereafter.

This invention reduces not only the time the drilling rig is tied up with logging — an important factor in the deep holes drilled today for oil and gas exploration and production — but also the time used in analyzing and interpreting the logs. This invention permits the well owner to find, with a quick visual comparison of the simultaneously recorded logs at the well site, the zones most likely to be productive. He will also have to do much less computation work to calculate the porosities and water saturations of those zones than he would have to do with previously available non-simultaneous logs.

Another important advantage of the simultaneously recorded logs obtained with this invention is that there is no chance of miscorrelating the logs as a function of depth. Logs obtained on separate traversals of the borehole almost inevitably result in depth errors, i.e., different correlations of the measurements of resistivity with depth of the measuring instrument in the borehole. Such depth correlation errors are particularly likely to occur when measuring resistivities, since these measurements are made before casing is put into the borehole and hence one is not able to make use of the casing joints and collars as fixed depth indicia.

It is well known in the art that, when a well is drilled through a porous and permeable formation, e.g., a gas or oil pay zone, the filtrate from the mud penetrates through the borehole wall into the formation. This causes the original formation to exhibit a resistivity which varies with respect to the distance laterally from the borehole. It is also known that, with a shallow investigation focused logging tool, a reliable resistivity value, $R_{xo}$, of the flushed zone can be recorded and thereafter used with the known mud filtrate resistivity, $R_{mf}$, to obtain a formation factor, F, or porosity value, $\phi$, for the formation of interest. With a medium depth of investigation tool, a fairly reliable value of the resistivity of the invaded zone, $R_i$, can be recorded and, with deep depth of investigation tool, an apparent formation resistivity, $R_a$, may be measured which has a value that is more or less near the true formation resistivity, $R_t$, depending on the resistivity contrasts, $R_t/R_i$ and $R_i/R_m$, and on the diameter of the invaded zone, $D_i$. However, the measured $R_t$ also depends on $D_i$ which is not known, so that the true value of $R_t$ is also unknown. As a result, the values of $R_t$ calculated from measurements with these separately recorded logs have considerable uncertainty. My invention provides simultaneous measurements of resistivities at medium and deep depths into the formations and, since the same spacing (the spreads are different) is used for each of the two measurements, the two measurements are similarly affected by the zones near the borehole wall. Thus, subtraction of the two measurements will yield a measurement only of the deeper, relatively uncontaminated zones of the formations, i.e., a much improved value of $R_t$. The apparatus of my invention includes an automatic subtraction feature which produces a signal which, when recorded in correlation with the depth of the instrument in the borehole, is an improved $R_t$ log of the formations.

Today deep gas-oil-wells are frequently drilled with highly conductive salty muds. This results in very high resistivity contrasts $R_t/R_m$ and $R_i/R_m$ so that conventional resistivity logs are not usable, due to the mud column effectively acting as a shortcircuit; this is particularly true when the formations of interest are relatively thin. Similarly the induction log of formation conductivities is not usable in these circumstances, because a very large fraction of its signal is caused by the borehole fluid and it is not possible to obtain an accurate measure of this borehole contribution (this is also true for the newer combination focused-induction log systems).

Conventional focused resistivity logging too are the presently preferred instruments for determination of the true resistivity, $R_t$, of formations when the resistivities of the formations of interest are much higher, say 50 times, than the resistivity of the borehole fluid and also when the borehole fluid is highly conductive, e.g., when salty mud was used in drilling the borehole.

The focused resistivity logging tool is also especially adapted and useful for obtaining measurements of formation resistivities where the resistivity varies significantly between adjacent formations and where the formations are relatively thin and where the formations of particular interest have high permeabilities and are deeply invaded with mud filtrate.

With focused resistivity logging tools, the surveying current is prevented from being shortcircuited by the borehole fluid and instead a relatively thin disc of current is forced to penetrate the formation transverse to the borehole. As is well known, this focusing effect is accomplished by symmetrically placing focus electrodes on opposite sides of a survey-current emitting electrode and causing a focusing current with appropriate polarity, phase, and amplitude to be transmitted from these electrodes through the formation to a remote return electrode. In these systems the survey current is maintained at a constant value and the focusing current is continuously varied during the logging operation in such a way as to maintain the electric potential of selected regions of the borehole between the focus electrodes and the survey electrode at a value very close to that of the survey electrode. The absence of a potential difference either up or down the borehole in the vicinity of the survey electrode permits the survey current to flow in the shape of a disc from the survey electrode directly into the formations adjacent thereto and prevents the shortcircuiting effect of the borehole fluid. It is obvious that the disc of survey current does not extend an infinite distance from the borehole. It is known that the lateral extent of the disc is determined by the distances between the survey electrode, the focusing electrodes, and the return electrodes. Generally, as the spread (the distance between the survey electrode and the focus electrode) and the distance between the focus electrode and its return electrode increase so does the lateral extent of the current disc. For such a system, the potential difference between the survey electrode and an electrically remote electrode is directly proportional to the resistivity of the formation traversed by the survey current while it is still disc shaped. The proportionality constant is commonly called the calibration constant of the particular system.

The survey current is supplied to the survey electrode from a constant current device. Theoretically, the survey current could be a direct current. However, in practice it is much superior to us an alternating current of relatively low frequency, say less than 500 hertz, or a square wave generated by commutating a direct current supply. The alternating polarity of the survey current with respect to its remote electrode is desirable in order to avoid polarization of the survey electrode which occurs when a direct current is emitted therefrom for an appreciable period. Use of an alternating current for the surveying current requires that the signal representing the potential difference between the survey electrode and the point electrically remote therefrom be rectified or synchronously commutated to obtain a direct current which may be recorded in the surface equipment of the type conventionally used in the electric logging industry.

This invention provides apparatus and methods for obtaining improved, but not necessarily precise, determinations of the undisturbed or true resistivity $R_t$ of the formations traversed by a subsurface instrument. The resistivity of a formation in its undisturbed state is, of course, a parameter indicative of the fluid content of the formation. Improved determinations of $R_t$ are accomplished by providing a subsurface tool which makes two focused resistivity logs with different depths of investigation and using the shallower measurement to correct the deep measurement. I make no contention that it is new to make simultaneous, dual measurements of formation properties, see U.S. Pat. No. 3,453,530 for a fairly recent example of such multiple measurements. However, the multiple electric logging measurements which have heretofore been used are not as effective in solving the problem of getting reasonably accurate true resistivity measurements of formations which are invaded to a medium depth and which have been penetrated by a borehole containing a highly conductive mud. Also, I am not aware of any previous logging apparatus capable of simultaneously obtaining medium and deep focused resistivity logs.

The very nature of focused resistivity systems is such that it is not obvious that one could make simultaneous focused resistivity logging measurements. In order to obtain the appropriate focusing action, the electrode structure is relatively complex and is required to extend over such a length that no one would consider running into a borehole a tool comprising two focused resistivity logging tools joined end to end with an appropriate isolating member between them. Furthermore, achieving the isolation of the pair of independent focused current systems which would be required in order to avoid undesired interactions is by no means simple. The survey current, in focused current logging systems, is restrained to flow in a disc shaped beam by means of focusing currents whose amplitudes are varied in accordance with measurements of potential differences in particular regions and these potential differences are very small. In fact, the best focusing action occurs when these potential differences are maintained at zero. This means, of course, that focused logging systems are very susceptible to interactions or cross-talk; the addition of another focused logging system would only magnify the opportunities for interaction or cross-talk.

It is an object of my invention to provide new and improved methods and apparatus for investigating subsurface earth formations traversed by borehole.

It is another object of my invention to provide new and improved logging apparatus which enables multiple focused current measurements to be obtained on a single pass through the borehole.

It is still another object of my invention to provide new and improved logging apparatus for making multiple subsurface measurements and for presenting the results in a manner which is readily interpreted.

It is yet another object of my invention to provide new and improved borehole exploration methods which provide indications of characteristics of the subsurface formations which are easier and quicker to interpret.

It is a further object of my invention to provide new and improved borehole investigating methods and apparatus which provide a more accurate overall picture of the nature and character of the subsurface formations.

It is an additional object of my invention to provide new and improved borehole exploration methods and apparatus which permit more accurate compensation for lateral invasion of drilling fluids into the subsurface formations.

It is still another object of my invention to provide new and improved focused current logging apparatus in which some of the preliminary calculations required for an interpretation of the resulting log are done prior to recording the results in correlation with the depth of the logging tool in the borehole.

An object of my invention is to provide new and improved well logging methods and apparatus of the focused resistivity log type which provide logs that are more accurately representative of the true formation resistivities.

In accordance with one feature of my invention, the method of obtaining an improved indication of the nature of subsurface formations penetrated by a borehole comprises the step of measuring the electrical resistivity of the formation material at a medium distance from the borehole by means of a first focused current electrode system. The method further includes the step of measuring the electrical resistivity of the formation material at a second and greater distance from the borehole by means of a second focused current electrode system. The method also comprises simultaneously recording these measurements in correlation with the depth of the logging tool in the borehole. In some embodiments of the invention, the method further comprises subtracting these two measurements and recording the result on the recording medium in correlation with the depth of the logging tool in the borehole. My invention also comprises novel apparatus for performing the above methods.

The objects of the invention are accomplished, generally, by a novel focused current logging apparatus which includes a conventional focused current apparatus to which is added means for separating the survey current into first and second survey currents which are alternately and repetitively emitted by the survey electrode, means for supplying a first (the conventional) focusing current to the focus electrodes only while the first survey current is supplied to the survey electrode, means for supplying a second focusing current to the focus electrodes only while the second survey current is supplied to the survey electrode, a pair of return electrodes for the second focusing current spaced relatively close to the focus electrodes, and means for recording a second focused resistivity log, whereby the two logs are obtained simultaneously on a single traverse of the borehole. In another embodiment of the apparatus of this invention, additional means are included for combining the signals representing the two resistivity measurements to obtain an improved determination of the true resistivities of the formations.

Other objects, features, advantages, and alternatives of this present invention will become apparent from the following detailed description when considered with the drawings in which:

FIG. 2 is a schematic representation of the subsurface instrument showing the interconnections between electrodes mounted on the instrument and the connections between the electrodes and the conductors of the logging cable;

FIG. 3 is a cross-sectional illustration of the logging cable;

DESCRIPTION OF PREFERRED EMBODIMENT

Figure 1:
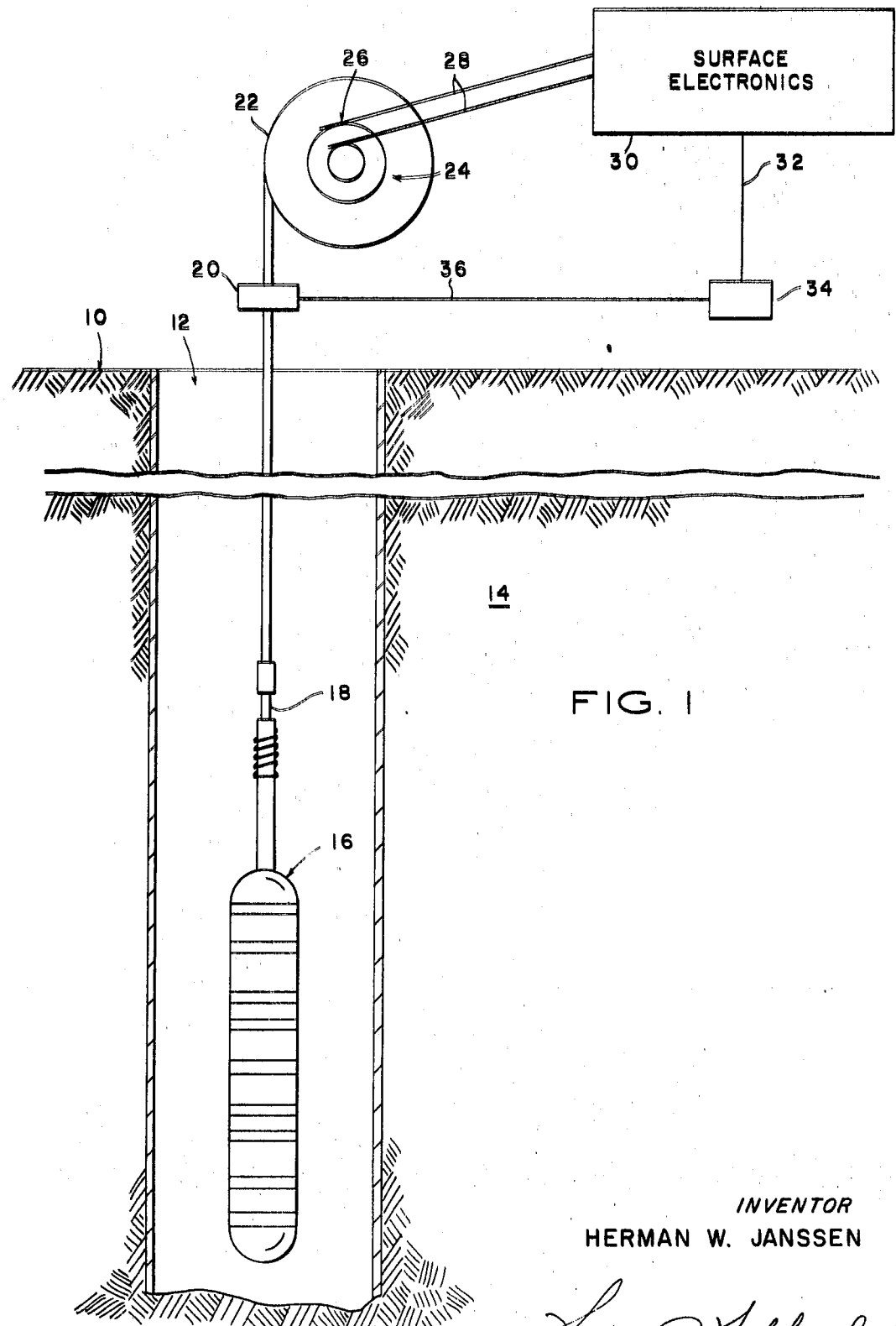
FIG. 1 is a schematic representation of a well-logging operation showing a subsurface instrument suspended by a logging cable which also electrically connects the instrument to surface electronics.

Referring now to the drawings in more detail, FIG. 1 illustrates a portion of the earth's surface 10 into which a borehole 12 has been drilled thereby penetrating the subsurface formations 14. Disposed within the borehole is a subsurface instrument 16, which is adapted to be raised and lowered therein by means of a multiconductor logging cable 18. The surface apparatus includes a measuring wheel 20 over which the cable 18 passes and a drum 22 on which the cable is wound, or from which it is unwound, when the instrument 16 is caused to traverse the borehole 12. The power means for driving drum 22 is conventional and is not shown. The conductors of the logging cable are connected to slip rings 24 (only two are shown for simplicity) mounted on the shaft of drum 22. Brushes 26 electrically connect the slip rings 24 to conductors 28 which lead into surface electronics unit 30. The surface electronics unit will be described in more detail later, but it includes a photo-recorder 100 such as is conventionally used in the logging industry. The recording medium of the recorder is driven in correlation with the depth of subsurface instrument 16 through connections 32 from a servomechanism 34, such as a Selsyn generator, which in turn is driven by measuring wheel 20 through mechanical linkage 36.

FIG. 2 illustrates the mechanical simplicity of the subsurface instrument used with this invention. A series of nine relatively narrow, spaced, electrically insulated electrodes 38, 40, 42, ..., 54 are mounted on the instrument housing 56. The outer surface of each of the electrodes is exposed through the exterior of housing 56 so that it will be in electrical contact through the borehole fluid with the adjacent formations 14. The housing and the electrodes mounted thereon are adapted to withstand the rigors of temperature, pressure, shock, abrasion, etc. commonly experienced in well logging. Housing 56 is suspended in a conventional manner from the cable 18. Focusing electrodes 40 and 42, commonly called the $A_1$ and $A_2$ electrodes, are electrically connected together by conductor 58 through the interior of housing 56. Monitoring electrodes 44 and 48, commonly called $M_1$ and $M_2$, are similarly electrically connected to the corresponding lower monitoring electrodes 46 and 50 ($M_1'$ and $M_2'$) by conductors 60 and 62 respectively. Nearby focus return electrodes 52 and 54 ($B_1$ and $B_2$) are similarly electrically connected by conductor 64. Monitoring electrodes $M_1$ and $M_2$ are electrically connected by conductors 66 and 68, respectively, to the input of a step-up transformer 70 mounted in a conventional manner in the interior of housing 56. The center taps of the primary and secondary coils of transformer 70 are electrically connected together by conductor 72.

The seven conductors and the armor of the usual electric logging cable 18 are labeled 1, 2, 3, ..., 7, and 8, respectively, in FIGS. 2 and 3. Electrodes 38, 40, and 52 are electrically connected internally of housing 56 to cable conductors 2, 1, and 7, respectively. The secondary coil or output terminals of transformer 70 are similarly electrically connected to cable conductors 3 and 5. The lower portion of armor 8 of cable 18 is electrically insulated from housing 56 and from the borehole fluid by a relatively long (say 75 feet) insulating bridle 74 attached to the lower end of cable 18 and to housing 56. Near the upper end of the bridle 74, cable conductor 4 is electrically connected to the cable armor 8. Remote electrode 76 comprising a few turns of conducting wire tightly wound around the exterior of bridle 74 is electrically connected to cable conductor 6.

FIG. 3 shows a typical cross-section of the usual electric logging cable and the relative spacing and configuration of the seven conductors 1, 2, 3, ..., 7, and armor 8. The conductors are, of course, insulated one from another and from the armor by electrical insulating material (not shown) which fills the remaining interior space of the logging cable. This configuration of conductors is the basis for their connection to the electrodes, transformer, and armor as illustrated schematically in FIG. 2. While other arrangements of the connections between the cable conductors and the electrodes, etc. would also be satisfactory, the one illustrated is preferred, since it is the one which leads to minimum cross-talk between the currents and signals transmitted over the various conductors.

Figure 4:
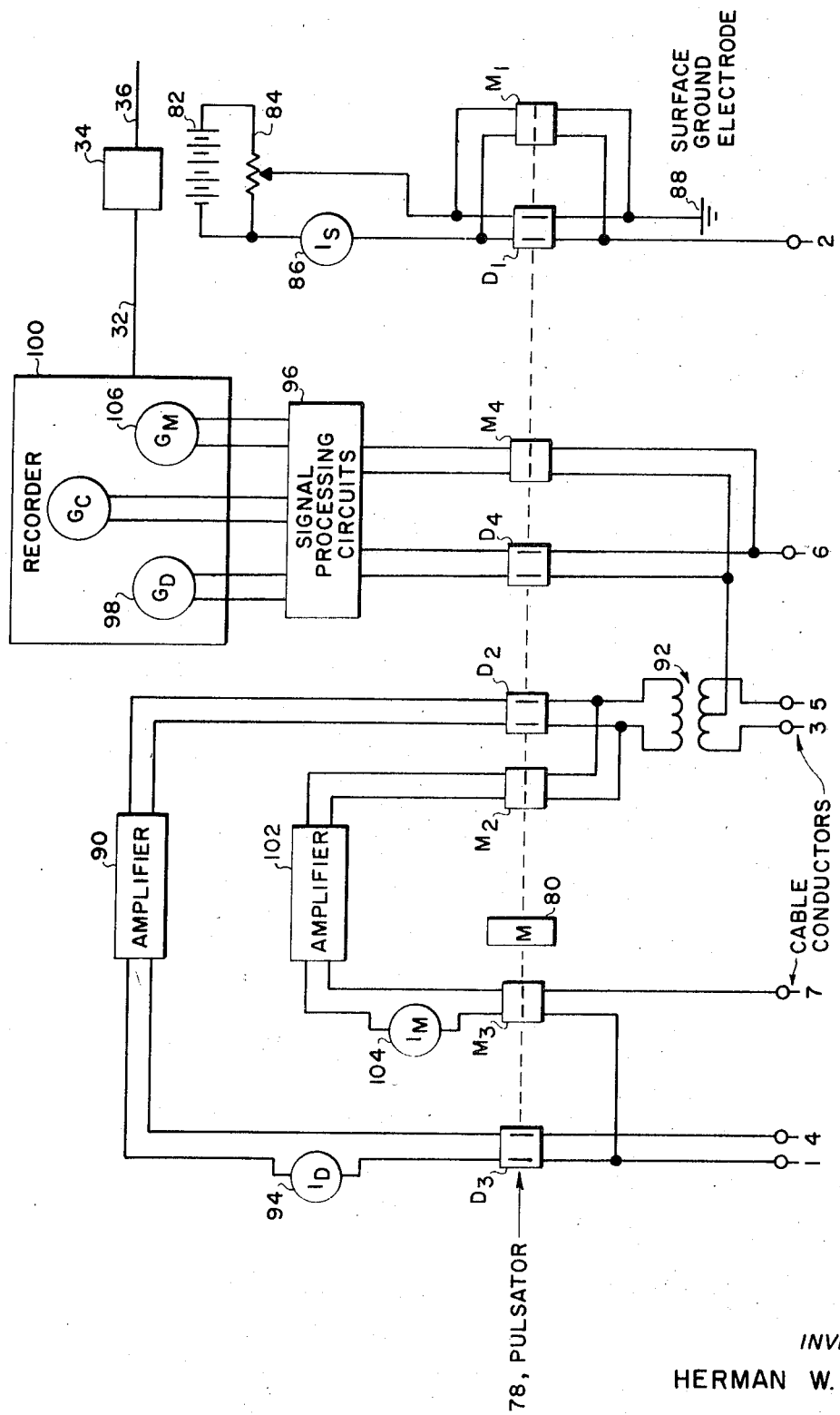
FIG. 4 is a schematic representation of the surface equipment used with the subsurface instrument to obtain two focused logs simultaneously.

FIG. 4 illustrates the surface electronics equipment 30 in block, schematic form. Since the details of the electrical circuitry included within the blocks shown on FIG. 4 form no part of my invention and those skilled in this art will be aware of suitable circuits for each block, I have not burdened this specification with the details.

Pulsator 78 performs an important function in my invention in that it synchronously and repetitively connects the individual conductors of logging cable 18 and hence the elements in the subsurface instrument, with the surface electrical circuits in two different patterns, one for a medium depth of investigation measurement and the other for a deep measurement. The pulsator acts as the master synchronizing element of this system; it divides the logging period into a repetitive series of short time intervals with the intervals alternately assigned, under control of the pulsator, to the medium and deep measurements. Even though the function performed by pulsator 78 is a key element of my invention, the structural details of the pulsator are not. For example, the pulsator, in appropriate cases may take the form of the plurality of motor-driven, dual-pole reversing switches illustrated in FIG. 4 or a plurality of synchronous rectifiers or a combination of an alternating current reference signal and a plurality of phase-sensitive amplifiers. In the embodiment shown, pulsator 78 comprises a motor 80 whose shaft is connected to and drives two sets, M and D, of rotatable, two-pole on/off switches with each set including four switches. Each switch is so arranged that the direction of current flow through it during each closure is opposite to the direction during the previous closure (see U.S. Pat. Nos. 2,779,912 and 2,779,913 for descriptions of some examples). The two sets of switches are so arranged that when driven by motor 80 first one set and then the other is in the closed or on position. For example, the M set may be closed for the first and third quarter of each revolution and the D set closed for the second and fourth quarter of each revolution of motor 80. However, my invention does not require one of the sets of switches M or D to be closed at all times. For example, there may be an interval after the M switches are opened before the D switches are closed and another interval following the opening of the D switches before the M switches are closed. Nor is it required that the pulsator switches reverse the direction of current flow on alternate closures; if they do not, the electrode polarization effects may be avoided by having the survey current for the deep measurement have opposite polarity from that for the medium measurement.

A survey current, $I_s$, is emitted by electrode 38 (commonly called $A_o$) and is supplied by battery 82 alternately through pulsator switches $D_1$ and $M_1$ and conductor 2 of logging cable 18 and thence to $A_o$. The return path of survey current $I_s$ is through the formations to a surface ground electrode 88. The survey current may be adjusted to a predetermined value by adjustment of the movable arm of rheostate 84 which is electrically connected across battery 82. The value of the survey current may be measured by an appropriate ammeter 86, which is connected in series with the $A_o$ electrode.

Now, for the moment, only the deep penetration focused current logging system (D-system) which includes electrodes 38, 44, 46, 48, 50, 40, and 42 mounted on subsurface instrument 16, the cable armor 8, and the remote electrode 76 will be described. This system is a deep investigation system, since the focus current return is via the cable armor 8 which is electrically remote from the focus current emitting electrodes $A_1$ and $A_2$. The survey current $I_s$ for this deep system, as noted above, is supplied to electrode $A_o$ by battery 82 via switch $D_1$ and cable conductor 2. From electrode $A_o$, the survey current flows through the adjacent borehole fluid into the formations and eventually returns to battery 82 via surface ground electrode 88, switch $D_1$, and rheostat 84.

The focusing current, $I_D$, for this system is supplied by power amplifier 90 through switch $D_3$ and conductor number 1 of logging cable 18 to focus electrodes $A_1$ and $A_2$. The return path for this focusing current is through the formations to the logging cable armor 8 and then to amplifier 90 via conductor 4 of logging cable 18 and switch $D_3$. As noted above, the purpose of the focusing current is to cause the survey current emitted by electrode $A_o$ to flow through the formations, for a predetermined, relatively large distance, substantially in the shape of a relatively thin, horizontal disc. For this to be accomplished, the electric fields in borehole 12 and formations 14 associated with the survey current $I_s$ emitted by electrode $A_o$ and with the focusing current $I_D$ emitted by electrodes $A_1$ and $A_2$ must counterbalance each other in a region near electrode $A_o$ so that there be no potential difference in this region to urge the current to flow vertically in the borehole or the nearby formation.

This counterbalancing must be done continuously and automatically as the subsurface instrument 16 traverses borehole 12. In the preferred embodiment of my invention, this continuous and automatic counterbalancing is accomplished by maintaining the survey current $I_s$ (and its associated electric field) constant and continuously and automatically varying the focusing current $I_D$ (and its associated electric field) as required by the changing character of the formations adjacent the borehole. When the focusing current $I_D$ is of the proper value there will be no, or at most a very small, potential difference between monitoring electrodes $M_1$ and $M_2$ and also between the corresponding pair of monitoring electrodes $M_1'$ and $M_2'$ below survey electrode $A_o$. Departures from this condition result in a potential difference between the monitoring electrodes. Such a potential difference is detected and stepped-up by transformer 70 which is connected to electrodes $M_1$ and $M_2$, and transmitted to the surface over conductors 3 and 5 of logging cable 18. At the surface, this signal is received by transformer 92 connected to logging conductors 3 and 5. The output signal from transformer 92 is transmitted to the input of amplifier 90 through switch $D_2$ of pulsator 78.

Figure 5:
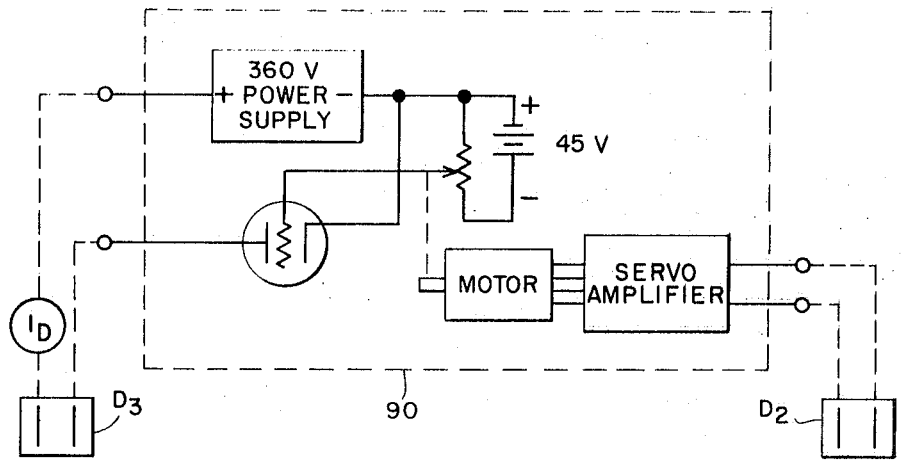
FIG. 5 is a schematic representation of an amplifier suitable for use with this invention.

Amplifier 90 is a power amplifier and includes a source of electrical energy. The output of amplifier 90 is unidirectional current whose magnitude varies above or below a predetermined value n response to the polarity of the potential of electrode $M_1$ with respect to that of electrode $M_2$; the amount of the variation is in accord with the absolute magnitude of the potential difference between electrodes $M_1$ and $M_2$. Amplifier 90 can take many forms, as those skilled in the art are aware. A suitable embodiment of such an amplifier is shown in FIG. 5. There, a servo-amplifier provides a two-phase output which drives a motor in the direction and by an amount appropriate to the polarity and magnitude of the input. The motor shaft is coupled to the moveable tap of a potentiometer which is connected across a battery thereby generating an appropriately varying control voltage fro an electron tube which is in the focus current circuit whereby the focus current is varied in response to potential difference across the monitoring electrodes $M_1$ and $M_2$.

An ammeter 94 continuously indicating the value of the focusing current, $I_D$, is provided in the output of amplifier 90 so that one is able to verify that the amplifier is responding to the changing conditions as the formations adjacent borehole instrument 16 change.

As noted above, the potential of survey electrode $A_o$ with respect to an electrically remote electrode is directly proportional to the resistivity of the formation penetrated by the survey current while it is still in the disc shape, i.e., before it spreads out and returns to the surface ground electrode 88. Of course, the "formation" through which the disc of survey current flows is a composite of the borehole fluid or mud, the mud cake, the invaded zone (often considered to be two zones, the flushed zone and the transition zone) and the uninvaded zone. So the measured resistivity of the "formation" is an apparent resistivity, $R_a$, rather than the true resistivity, $R_t$, of the formation. When the borehole fluid or drilling mud is highly conductive, the apparent resistivity of those formations of interest, i.e., those with reasonably high porosity and permeability, will be only slightly affected by the resistivities of the borehole fluid, the mud cake or the flushed zone. Thus, the measured and apparent resistivities can be converted to true resistivities by correcting for the resistivity of the transition zone which is at a medium depth laterally from the borehole.

Due to the counterbalancing effect of the focusing current, the potential of a point located between monitoring electrodes $M_1$ and $M_2$ with respect to the remote electrode 76 is directly proportional to the apparent resistivity of the "formation" traversed by the disc of survey current. Recording this potential rather than the potential of the survey electrode in correlation with the depth of the instrument 16 in the borehole will also give a log of the apparent resistivities of the formations traversed by instrument 16 and is usually more convenient. A measure of this potential is available at the center taps of transformer 70 in instrument 16 and at the center tap of the input of transformer 92. Conductor 6 of logging cable 18 is electrically connected to remote electrode 76 so that the signal to be recorded as a measure of the apparent resistivity of the formation is available in the surface electronics between conductor 6 and the center tap of transformer 92. This signal is transmitted to signal processing circuits 96 through switch $D_4$ of pulsator 78 and thence to galvanometer 98, $G_D$, of recorder 100.

Recorder 100 is preferably the conventional photorecorder used in the electric logging industry; hence it is unnecessary to describe it in detail. Such recorders include a light beam which is reflected from a mirror galvanometer onto a recording medium driven in correlation with the depth of instrument 16 in the borehole. Signal processing circuits 96 include conventional means for conditioning the apparent resistivity signal received from switch $D_4$ so that it will properly drive galvanometer $G_D$ contained within recorder 100. Galvanometer $G_D$ will thus provide a log of the deep apparent resistivities of the formations as a function of depth.

Now the medium penetration focus and current logging system (M-system) will be considered. The M-system has all of its subsurface electrodes, except the remote reference electrode 76, mounted on the subsurface instrument 16 and includes electrodes 38, 40, 42, 44, 46, 48, 50, 52, and 54 plus remote electrode 76. This system is a medium depth of investigation tool since the focus current return electrodes 52 and 54 (called the $B_1$ and $B_2$ electrodes) are relatively near the focus current emitting electrodes $A_1$ and $A_2$. For the usual tool dimensions, a suitable distance between the focus electrodes $A_1$, $A_2$ and the corresponding nearby focus return electrodes is of the order of forty inches.

The survey current $I_s$ for this medium system, as noted above, is supplied to electrode $A_o$ by battery 82 via switch $M_1$ and cable conductor 2. From electrode $A_o$, the survey current flows through the adjacent borehole fluid into the formations and eventually returns to battery 82 via surface ground electrode 88, switch $M_1$, and rheostat 84.

The focusing current, $I_M$, for the M-system is supplied by power amplifier 102 through switch $M_3$ and conductor number 1 of logging cable 18 to focus electrodes $A_1$ and $A_2$. The return path for this current is through the formations to focus return electrode $B_1$ and $B_2$ and thence to amplifier 102 via conductor 7 of logging cable 18 and switch $M_3$. As in the D-system, the continuous and automatic balancing of the electric fields in borehole 12 and formations 14 is effected by transmitting the potential difference between monitoring electrodes $M_1$ and $M_2$ to amplifier 102 via subsurface step-up transformer 70, conductors 3 and 5 of logging cable 18, surface transformer 92, and switch $M_2$ to effect the appropriate variation of focus current, $I_M$. Amplifier 102 is a power amplifier and includes a source of electrical energy and has the same function and characteristics as noted above for amplifier 90. Ammeter 104 is provided in the input of amplifier 102 as a monitor of the varying focus current, $I_M$.

The signal representing the medium depth apparent resistivity (which is essentially the resistivity of the transition zone) is developed between the center tap of subsurface transformer 70 and the remote reference electrode 76 and is transmitted to the surface over cable conductors 3, 5, and 6. At the surface the signal is taken from the center tap of transformer 92 and conductor 6 and transmitted to galvanometer 106, $G_M$, contained in recorder 100 through switch $M_4$ and signal processing circuits 96. Galvanometer $G_M$ will thus provide a log of the medium depth apparent resistivities of the formations as a function of depth and this log will be recorded by recorder 100 simultaneously with the deep resistivity log provided by galvanometer $G_D$. It should be pointed out that the signals for these two logs appear at the same point (the center tap of transformer 92) in the surface electronics and must be separated one from another before recording. This separation is accomplished by pulsator 78 and, in particular, by switches $M_4$ and $D_4$ thereof.

Figure 6:
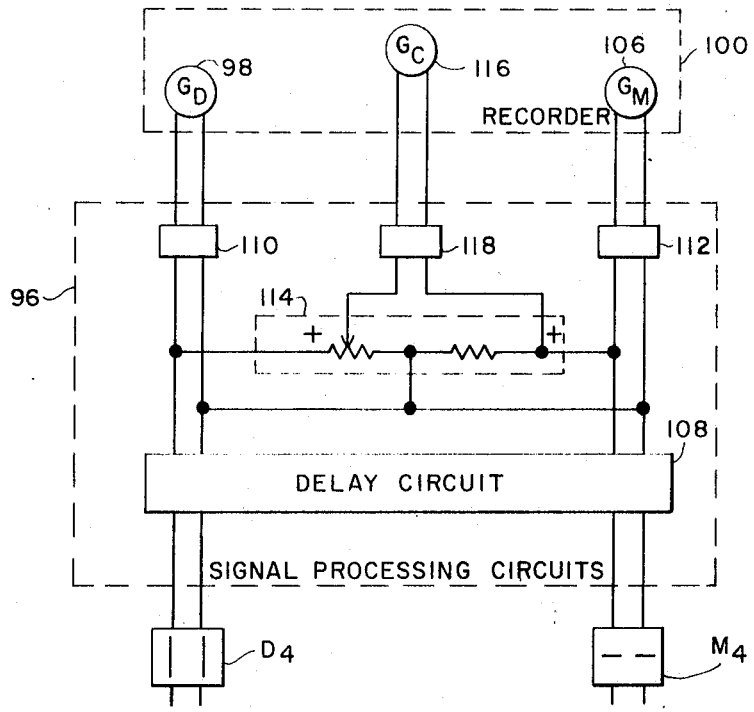
FIG. 6 is a schematic representation of signal processing circuits.

To obtain a log of the compensated deep resistivity measurement I have provided in the signal processing circuits 96 a means to combine the signals from the deep and the medium focused current logging systems. Because the signals from the D-system and the M-system for a particular depth have a time difference of one quarter of a pulsator revolution, say about 15 milliseconds, the signals from switches $D_4$ and $M_4$ are conducted to a delay circuit 108 (a capacitative circuit for example) which delays one signal, say the deep signal, for the appropriate time. As shown in FIG. 6, one output of delay circuit 108 is conducted to galvanometer $G_D$ via galvanometer drive circuit 110 to provide the above-referred to deep resistivity log. Another output of delay circuit 108 is conducted to galvanometer $G_M$ via galvanometer drive circuit 112 to provide the medium resistivity log. The two delay circuit outputs are subtracted in subtraction circuit 114 and the output thereof is conducted to galvanometer 116, $G_c$, via galvanometer drive circuit 118 to obtain the compensated resistivity log.

Subtraction circuit 114 consists simply of a center-tap potentiometer. The movable arm of the potentiometer is adjusted so that galvanometer $G_c$ records a zero value when both inputs to the delay circuit 108 have zero value.

Galvanometer drive circuits 110, 112, and 118 are similar means for conditioning the corresponding resistivity signals received at their inputs so that they will properly drive the corresponding galvanometers. These circuits may include means for compensating for the minor differences in sensitivity of the galvanometers and for taking into account the calibration factors for the D- and M-systems so that the logs directly record the formation resistivities rather than values proportional thereto.

I have now described the apparatus and method of obtaining simultaneously three resistivity logs: a medium and a deep depth of investigation focused log and a log compensated for the effects of formation zones near the borehole.

The medium log is a record of the resistivities of the invaded zones of the formations traversed by the subsurface instrument, i.e., it is a log of $R_i$. The compensated log is a record of the true resistivities ($R_t$) of the formations which have invasion depths less than about 40 inches; where the invasion depths are greater than this, the compensated log gives resistivity values closer to $R_t$ than are obtained with previous systems. The deep log gives a value intermediate $R_i$ and $R_t$.

Comparison of the two focused current logs recorded simultaneously by galvanometers $G_D$ and $G_M$ of recorder 100 will quickly identify for the well operator those formations with apparent resistivities which vary as the depth of investigation varies. These formations are those which are potentially productive, since these formations are permeable. Those porous, permeable formations with medium mud filtrate invasion depths will show separations of the medium and compensated logs. Where the mud filtrate resistivity is not too different from the connate water resistivity, the separation of the medium and compensated curves increases with increasing hydrocarbon saturation of a porous, permeable formation.

While the above description covers what is presently considered to be a preferred embodiment of my invention, it will be obvious to those skilled in the art that various changes and modifications may be made without departing from the invention. For example, in addition, its application to the above-described focused logging apparatus which uses multiple, relatively narrow electrodes (commonly called laterolog apparatus), my invention may be applied to the guard type focused logging apparatus. The guard log apparatus differs from the laterolog apparatus only in the subsurface instrument.

Figure 7:
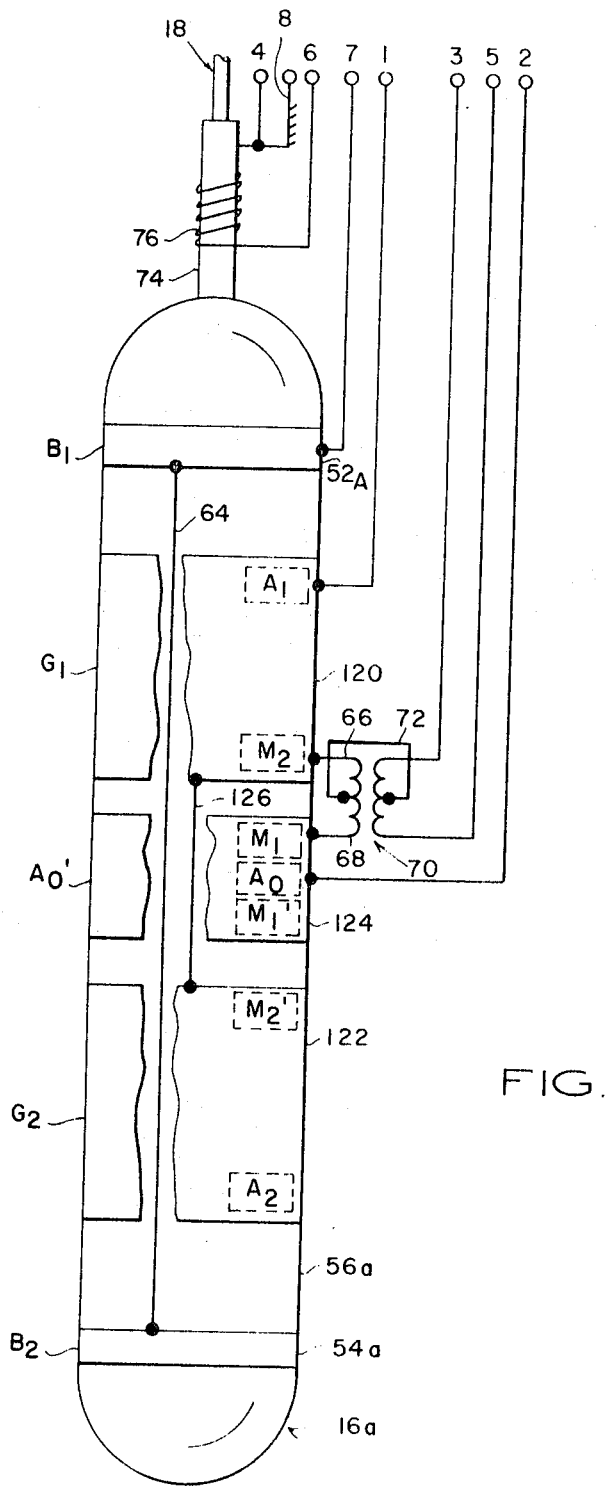
FIG. 7 is a schematic representation of an alternative subsurface instrument.

The subsurface instrument of a guard logging apparatus is illustrated in FIG. 7. This corresponds to the subsurface instrument of a laterolog apparatus as shown in FIG. 2; corresponding numbers are used for corresponding elements. In the guard logging apparatus a relatively thick survey electrode 124 is insulatedly mounted on housing 56a and is electrically connected to conductor 2 of logging cable 18. A pair of quite thick guard electrodes 120 and 122 are insulatedly mounted on housing 56a on opposite sides of survey electrode 124 and are electrically connected together by conductor 126. Electrode 120 is electrically connected to conductor number 1 of logging cable 18. Nearby focus return electrodes 52a and 54a are insulatedly mounted on housing 56a outboard of guard electrodes 120 and 122. Electrodes 52a and 54a are electrically connected together by conductor 64 and are electrically connected to logging conductor 7 of cable 18. In this system the monitoring signal is the potential difference between guard electrode 120 and survey electrode 124 and is detected by transformer 70 whose input is connected to these electrodes by conductors 66 and 68. The operation and use of this guard log instrument exactly corresponds to that described above in connection with the laterolog instrument of FIG. 2.

It will be understood that various changes in the details, arrangement of parts, and steps which have been described and illustrated in order to explain the nature of my invention, may be made by those skilled in this art within the principle and scope of the invention as expressed in the appended claims.

The embodiments of the invention in which an exclusive property or privilege is claimed are defined as follows:

1. A logging apparatus for measuring characteristics of earth formations surrounding a borehole, comprising:
   an elongated instrument adapted to traverse an earth borehole;
   means for supplying a first electrical current of alternating polarity to a first electrode insulatedly mounted on said instrument for emission through said formations to a remote point;
   first focusing means comprising at least one focus electrode insulatedly mounted on said instrument and means for supplying, only during the times one polarity of said first current is emitted from said first electrode, a first focusing current to said focus electrode for emission through said formations to a first focus current return electrode electrically remote from said focus electrode thereby causing one polarity of said first current to travel laterally from said first electrode in a disc shape for a substantial distance before traveling to said remote point;
   second focusing means comprising at least one second focus current return electrode insulatedly mounted on said instrument relatively near said focus electrode and means for supplying, during the times the other of said polarities of said first current is emitted from said first electrode, a second focusing current to said first focus electrode for emission through the formations to said second return electrode thereby causing the other polarity of said first current to travel laterally from said first electrode in a disc shape for a relatively short distance before traveling to said remote point;
   at least one pair of monitoring electrodes insulatedly mounted on said instrument intermediate said first electrode and said focus electrode;

means for measuring the potential difference between said pair of monitoring electrodes and for generating a first electrical signal indicative of said potential difference;

means for varying the magnitude of the first and the second focusing currents emitted by said focus electrode in response to said first electrical signal;

means for generating a second electrical signal indicative of the potential intermediate said monitoring electrodes with respect to an electrically remote electrode; and means for time separating said second signal into a deep signal and a medium signal which are, respectively, in synchronism with said one and said other polarities of said first electrical current.

2. A logging apparatus according to claim 1 comprising in addition thereto means for simultaneously recording said deep and medium signals in correlation with the depth of said instrument in the borehole.

3. A logging apparatus according to claim 1 comprising in addition thereto means for combining said deep and medium signals whereby an improved true resistivity signal is obtained.

4. A logging apparatus according to claim 3 wherein said combining means comprises:

means for delaying said deep signal or said medium signal for a time sufficient to bring the two signals into depth correlation;

means for subtracting said medium signal from said deep signal following said delay whereby a compensated signal is generated; and means for recording said compensated signal in correlation with the depth of said instrument in the borehole.

5. A logging apparatus according to claim 4 comprising in addition thereto a multiconductor, armored logging cable for supporting said instrument during traversal of the borehole and for permitting transmission of said currents and signals between the instrument and the earth's surface and with the lower portion of the armor electrically insulated from said instrument and from the borehole fluid and the remaining portion of said armor being said electrically remote first focus current return electrode.

6. A logging apparatus according to claim 5 wherein said electrically remote point comprises an electrode mounted on the exterior of the insulated portion of said armor.

* * * * *